US012549831B2

(12) United States Patent
Kassner

(10) Patent No.: US 12,549,831 B2
(45) Date of Patent: Feb. 10, 2026

(54) EYE TRACKING MODULE AND HEAD-WEARABLE DEVICE

(71) Applicant: PUPIL LABS GmbH, Berlin (DE)

(72) Inventor: Moritz Kassner, Berlin (DE)

(73) Assignee: PUPIL LABS GmbH, Berlin (DE)

( * ) Notice: Subject to any disclaimer, the term of this patent is extended or adjusted under 35 U.S.C. 154(b) by 96 days.

(21) Appl. No.: 18/382,095

(22) Filed: Oct. 20, 2023

(65) Prior Publication Data

US 2024/0147031 A1 May 2, 2024

Related U.S. Application Data

(60) Provisional application No. 63/419,828, filed on Oct. 27, 2022.

(30) Foreign Application Priority Data

Oct. 27, 2022 (EP) .................................... 22204115

(51) Int. Cl.
*H04N 23/11* (2023.01)
*G02B 6/42* (2006.01)
*G06F 3/01* (2006.01)

(52) U.S. Cl.
CPC ........... *H04N 23/11* (2023.01); *G02B 6/4298* (2013.01); *G06F 3/013* (2013.01)

(58) Field of Classification Search
None
See application file for complete search history.

(56) References Cited

U.S. PATENT DOCUMENTS 10,025,379 B2 * 7/2018 Drake ........................ A61B 3/14
11,982,878 B2 * 5/2024 Glasenapp ......... G01M 11/0228
12,270,992 B2 * 4/2025 Zhang ................ G02B 27/0093
2016/0041384 A1 * 2/2016 Robbins .................. G06F 3/013 359/630
2016/0085300 A1 * 3/2016 Robbins ............... H04N 23/673 345/633
2017/0147859 A1 * 5/2017 Zhang ........................ G06T 7/70
2018/0232048 A1 * 8/2018 Popovich ............... G02B 6/105
2019/0041634 A1 * 2/2019 Popovich ................ G01S 17/66
2022/0261076 A1 * 8/2022 Choi ........................ G06F 3/013
2022/0342224 A1 10/2022 Kassner
2022/0350153 A1 * 11/2022 Takashima ......... G02B 27/0093
2024/0147031 A1 * 5/2024 Kassner ............. G02B 27/0172

FOREIGN PATENT DOCUMENTS

CN 113 795 783 12/2021
WO 2014/089542 6/2014
WO 2021/164867 8/2021

* cited by examiner

*Primary Examiner* — Talha M Nawaz
(74) *Attorney, Agent, or Firm* — Dicke, Billig & Czaja, PLLC

(57) ABSTRACT

An eye tracking module for a head-wearable device of a user includes an electronics carrier, an image sensor arranged on the electronics carrier, an optical path for receiving visible light at the image sensor from a first region of interest, and an IR-waveguide arranged with respect to the optical path such that received visible light is at least substantially not diverted and/or guided by the IR-waveguide. The IR-waveguide includes a first input aperture for receiving IR-light from a second region of interest which is different to the first region of interest, and an output aperture for outputting at least a part of the received IR-light towards the image sensor.

20 Claims, 5 Drawing Sheets

EYE TRACKING MODULE AND HEAD-WEARABLE DEVICE

CROSS REFERENCE TO RELATED APPLICATION

This Non-Provisional patent application claims the benefit of the filing date of U.S. Provisional Patent Application Ser. No. 63/419,828, filed Oct. 27, 2022, and claims priority to European Patent Application Number 22204115.4, filed Oct. 27, 2022, both of which are herein incorporated by reference.

TECHNICAL FIELD

Embodiments of the present invention relate to eye tracking modules and head-wearable devices that may be used for eye tracking and/or to detect one or more gaze-related parameters of a user.

BACKGROUND

Portable eye tracking devices, for example in the form of head-wearable spectacle-like systems offer many advantages over stationary, remote eye tracking systems when it comes to the range of possible application scenarios and use cases. Outdoor activities like sports or tasks like operating large machinery are examples for eye tracking application areas in which free head and body movement is required and for which head-worn devices are thus the solution of choice.

Usually, at least one eye camera having a suitable lens and a sensor is used per eye of the wearer for eye-tracking (i.e. at least two eye cameras per device). The eye camera(s) are aimed directly at the respective eye of the wearer that may be illuminated using infrared- (IR-) light. Further, depending on the desired device functionality, a scene camera for observing a field of view of the wearer may be attached to the portable eye tracking device.

Unobtrusively integrating the cameras and/or IR-illumination means remains challenging and/or is costly, in particular for spectacle-type eye tracking devices. It is in particular challenging to place the eye cameras in such a way that they focus well on the eyes but at the same time do not restrict the user's field of view too much. Further, flexibility and/or adaptability to different use cases of known portable eye tracking devices is often not as actually desired.

Accordingly, there is a need to further improve portable eye trackers and head-wearable devices, respectively.

SUMMARY

According to an embodiment of an eye tracking module for complementing a head-wearable device of a user, which is in the following also referred to as head-wearable user device, in particular for attachably complementing (a support structure of) the head-wearable device, the eye tracking module includes an electronics carrier, an image sensor arranged on the electronics carrier, an optical path for receiving visible light at the image sensor from a first region of interest, and an IR-waveguide arranged with respect to the optical path such that received visible light is at least substantially not diverted and/or guided by the IR-waveguide. The IR-waveguide includes a first input aperture (that may also be denoted as in-coupling aperture) for receiving IR-light from a second region of interest which is different to the first region of interest, and an output aperture (that may also be denoted as out-coupling aperture) for outputting at least a part of the received IR-light towards the image sensor, typically for outputting at least a part of the received IR-light directly to the image sensor (onto the image sensor).

No optical element, in particular no IR light diffracting and/or deflecting element, may be arranged between the output aperture (or the whole waveguide) and the image sensor.

For example, no prism, such as a coupling prism, may be arranged between the output aperture and the image sensor (or even between the waveguide and the image sensor).

Due to using an IR-waveguide that does at least substantially not divert and/or guide and typically also at most only slightly attenuates visible light, the electronics carrier and the image sensor may be unobtrusively integrated in the eye tracking module in a comparatively simple and compact way.

Typically, the IR-waveguide is configured for not guiding visible light. More typically the IR-waveguide is at least substantially transparent for the visible light, at least in a portion that is arranged in the optical path. Accordingly, the visible light received via the optical path may traverse the IR-waveguide without being significantly changed.

The IR-waveguide may also be at least substantially transparent for the visible light in other parts or even all parts.

Even further, the eye tracking module may be removably connectable with a support structure of the head-wearable device, in particular a central portion of the support structure which typically provides and/or is shaped (in a lower part) as a nose bridge portion. In these embodiments, the eye tracking module may be removed from the head-wearable device when not required. For example, if the head-wearable device is embodied as a spectacles device, it may then be used as normal glasses.

Furthermore, only a single image sensor may be used for taking images of several regions of interest, in particular a field of view of the user wearing the head-wearable device as first region of interest, a second region of interest which is related to a first eye of the user wearing the head-wearable device, and/or a third region of interest which is related to a second eye of the user wearing the head-wearable device. The second and third regions of interest may in particular refer to respective ocular areas of the user's eyes.

For receiving IR-light from the third region of interest, the IR-waveguide typically has a second input aperture.

The IR-waveguide may be configured to guide IR-light from the first input aperture to the output aperture, and/or from the second input aperture to the output aperture, and thus to the (single) image sensor and light sensitive pixels arranged on a single electronics carrier, respectively.

However, the image sensor may also be implemented as a two-part image sensor arranged on the common/single electronics carrier, i.e. as an image sensor with a visible light sensitive part and an IR-light sensitive part adjacent to or spaced apart from the visible light sensitive part (but arranged on the common/single electronics carrier). Each of the two image sensor parts are typically implemented as respective sensor array.

Even further, the IR-waveguide may additionally be used for guiding IR-light from one or more IR-light sources such as respective IR-LED, in particular only one IR-light source arranged on the electronics carrier towards the user's eye(s), more particular the ocular area(s) of the user's eye(s).

In particular, the IR-waveguide may be arranged and formed such that the output aperture may receive illumination light from the IR-light source(s).

Typically, the electronics carrier has an (electric and/or optical) interface, in particular an electric (or optical) data interface and an electric power interface or a (combined) electric data and power interface, for example an interface providing USB-functionality or the like, and/or a controller functionally connected with at least one of, typically all of: the interface, the image sensor, and the IR-light source(s).

The controller is typically configured to control the functionally connected components, in particular the image sensor and the IR-light source(s), and to use (image) data received from the image sensor, to generate time-correlated images of at least two of the first region of interest, the second region of interest and the third region of interest, in particular to generate time-correlated images pairs comprising a scene image representing the first region of interest and a concatenated eye image representing the second region of interest and the third region, to postprocess the time-correlated images and/or the data received from the image sensor, in particular using a trained neural network, and/or to transmit the time-correlated images and/or the data received from the image sensor via the (data) interface.

The image data provided by the image sensor may already include concatenated left and right eye images of the user.

Typically, the optical path (for receiving visible light from a first region of interest) is at least substantially straight. This enables a particularly compact and/or light-weight design of the eye tracking module. Accordingly, wearing comfort and/or unobtrusiveness may be increased.

The IR-waveguide may in particular have, in a direction which is at least substantially parallel to the optical path and/or at least substantially perpendicular to an image plane of the image sensor defining an optical axis of the image sensor, at least in embodiments referring to a straight optical path typically at least substantially coinciding with the optical axis, a thickness of at most about 2 mm, more typically at most about 1 mm.

Note that the optical path typically corresponds to a centre ray of the received visible light (that may be divergent). In embodiments referring to a straight optical path, the optical path typically runs along the optical axis, but in the opposite direction.

Typically, the IR-waveguide is, in a projection onto the image plane and/or a projection plane at least substantially perpendicular to the optical path and/or the optical axis, substantially U-shaped, and/or has a first leg portion and a second leg portion providing the first input aperture and the second input aperture, respectively.

The first and second leg portions may extend from an at least substantially flat central portion of the IR-waveguide. The central portion typically provides the output aperture and may be arranged close to the image sensor.

The first and second leg portions may themselves be substantially flat. The planes defined by such flat leg portions may form an angle different from 0° or 180° with the substantially flat central portion of the IR-waveguide. This may aid in optimally orienting the input aperture forming leg portions for aiming them at the second respectively third regions of interest.

The planes defined by flat leg portions may also be co-planar with the substantially flat central portion of the IR-waveguide, such that the entire IR-waveguide may form a substantially flat structure. This results in a particular simple manufacturing process.

The central portion as well as the first and second leg portions are typically at least substantially transparent for visible light.

Furthermore, the IR-waveguide or even the eye tracking module may be at least substantially mirror symmetric with respect to a symmetry plane at least substantially parallel to the optical path and/or the optical axis.

The term "at least substantially mirror symmetric with respect to a plane" as used within specification intends to describe that at least the outer shells or boundaries of two elements or objects are mirror symmetric with respect to the plane with an accuracy which is typically achievable with the materials and manufacturing methods used, in particular with an accuracy of at least 5% or even at least 2% or 1%, at least on average, and/or that two (virtual) parts of an outer shell or boundary of one element or object are mirror symmetric with respect to the plane with an accuracy of at least 5% or even at least 2% or 1%, at least on average. In particular, a centre of gravity of the outer shells lies within the plane or is at most about 1 mm or even at most about 0.5 mm, more typically at most about 0.2 mm spaced apart from the plane.

The IR-waveguide may be implemented as a one-piece structure. Accordingly, manufacturing and assembling of the eye tracking module may be facilitated.

Typically, the IR-waveguide includes or even is composed of a carrier or substrate and a thin polymeric film, in particular a single thin polymeric layer arranged on the carrier or substrate. This also facilitates a compact and/or light-weight design of the eye tracking module.

However, the IR-waveguide may also have a stack of polymeric layers instead of the single thin polymeric layer.

The image sensor may have interleaved visible light sensitive sensor areas (typically having one or more visible light sensitive pixels) and IR-sensitive sensor areas (typically having one or more IR-light sensitive pixels).

In particular, the image sensor may be (implemented as) an RGB-IR sensor typically including an RGB-IR kernel, for example a 4×4 RGB-IR kernel, more typically a plurality of RGB-IR kernels.

The image sensor may include an (monochrome/wide-band) array sensor, and a filter arranged on the array sensor, in particular a Bayer filter.

Typically, the eye tracking module further includes an (at least one) optical element arranged in the optical path and/or the optical axis, in particular a receiving aperture for the visible light and/or a lens or even a lens system arranged between the receiving aperture and the image sensor for projecting the visible light onto the sensor, in particular onto the (IR and visible light sensitive) image plane.

The eye tracking module typically has a housing connected with the electronics carrier and covering at least one of, typically all of the central portion of the IR-waveguide, the IR-light source, and the image sensor.

The housing may provide the receiving aperture for the visible light.

According to an embodiment of a head-wearable device, the head-wearable device includes a support structure including a central portion typically providing and/or being shaped as a nose bridge portion, and an eye tracking module as explained herein which is connected with the central portion, typically attached to the central portion.

Further, a plug-socket connection may be formed between the interface of the electronics carrier and a connector of the central portion.

The head-wearable device may be a spectacles device and/or have a frame providing the central portion.

The head-wearable device may however also be implemented as pilot visor helmet, a goggles, a skiing-goggles, a swimming-goggles, a sports helmet, or a welding protective googles.

The head-wearable device complemented with/including the eye tracking module may also be described as a (head-wearable) system comprising a head-wearable support structure and an eye tracking module which is mechanically and typically also electrically connected with a central portion of the head-wearable support structure.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

For sake of clarity, the figures are provided with a respective Cartesian co-ordinate system x, y, z typically representing a respective eye tracking module coordinate system and scene camera coordinate system, respectively. The z-axis may correspond to a substantially vertical direction when the head-wearable device complemented with the eye tracking module is worn by a user in a typical situation and with upright body posture, respectively.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

Figure 1A:
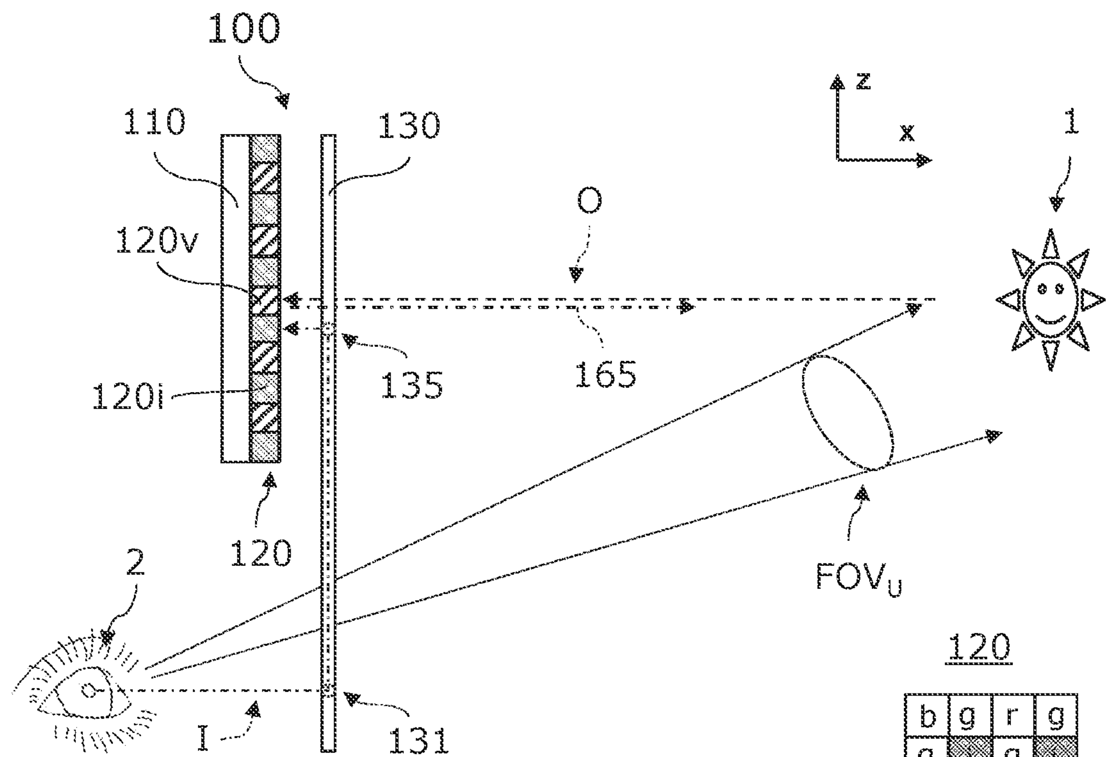
FIG. 1A illustrates a schematic side view of an eye tracking module for a head-wearable device of a user according to an embodiment.

With reference to FIG. 1A, an embodiment of an eye tracking module 100 for complementing a head-wearable device of a user is explained.

In the exemplary embodiment, eye tracking module 100 includes an electronics carrier 110 which is provided with an array image sensor 120 having a plurality of visible light sensitive sensor areas 120*v* and a plurality of IR-sensitive sensor areas 120*i*.

Electronics carrier 110 may be implemented as a PCB-board and/or be equipped with electronic as well as electric components.

Figure 1B:
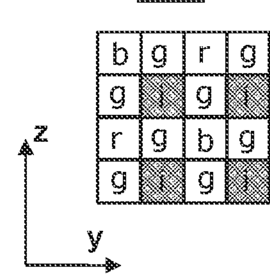
FIG. 1B illustrates a front view of an image sensor of the eye tracking module shown in FIG. 1A according to an embodiment.

Image sensor 120 may be implemented as an RGB-IR sensor with a plurality of RGB-IR kernels, e.g. 4×4 RGB-IR kernels as shown in FIG. 1B, i.e. kernels having pixels that are selectively light sensitive for red light (r), green light (g), blue light (b) and IR-light (i), respectively.

The RGB-IR kernels are arranged in an image or imaging plane typically defining an optical axis 165 of image sensor 120.

For reasons of accuracy, the image sensor 120 may have a resolution of at least 800×600 pixels, more typically of at least 1024×768 pixels, and even more typically of at least 1280×1024 pixels or at least 1920×1080 pixels (at least VGA SVGA or HD).

In the exemplary embodiment, the optical axis 165 matches, except for the direction which is opposite, with an optical path 0 for receiving visible light at the image sensor 120 from a first region of interest 1 substantially corresponds to a field of view $FOV_U$ of the user wearing the head-wearable device including the eye tracking module 100 or a part of the field of view $FOV_U$ of the user.

Note that FIG. 1A is not to scale and that a distance between image sensor 120 and the first region of interest 1 may be orders of magnitude larger than a distance between image sensor 120 and the eyes of the user. For reasons of clarity, only one of the user's eyes is illustrated in FIG. 1A.

An IR-waveguide 130 which is a least substantially transparent for the visible light (at least at the red, green and blue wavelengths the sensor 120 is sensitive for) is arranged in the optical path 0.

Accordingly, any visible light (with wavelengths the sensor 120 is sensitive for) received from the first region of interest 1 may be transmitted through the IR-waveguide 130 at most slightly attenuated (e.g. at most a few percentages or even 1%) and at most slightly diverted (e.g. at most a few percentages or even less than 1%). The rays of the received visible light that are parallel to the optical axis are typically not diverted at all. Angled incident light rays may have a slight offset after leaving the IR-waveguide 130 typically acting as a plane-parallel plate for the received visible light. Note that the visible light may also be divergent.

The formulation that the received visible light is at least substantially not diverted and/or guided by the IR-waveguide intends to describe that the IR-waveguide may act as a plane-parallel plate for the received visible light. In particular and different to the IR-light properties, the IR-waveguide is typically neither configured for total internal reflection of visible light received from the first region of interest nor provides gratings for bundling, guiding or otherwise deflecting visible light.

IR-waveguide 130 has a first input aperture 131 for receiving IR-light from a second region of interest 2 related to a first eye of the user, e.g. a right eye of the user, and an output aperture 135 for outputting at least a part of the received IR-light towards image sensor 120.

In the exemplary embodiment, no optical element such as a prism, a mirror, or a lens is arranged between output aperture 135 and image sensor 120.

Accordingly, the IR light is output from the output aperture 135 directly to the image sensor 120.

The IR-apertures may be implemented using respective IR-gratings or etched structures.

As indicated by the dashed-dotted arrow I in FIG. 1A, IR-waveguide 130 is operable as waveguide for IR light received from the second region of interest 2.

Likewise, IR-waveguide 130 typically has a second input aperture for receiving IR-light from a third region of interest related to a second eye of the user, e.g. a left eye of the user.

In this embodiment, IR-waveguide is typically also configured to guide IR-light from the second input aperture to the output aperture 135.

Accordingly, eye tracking as well as scene camera functionality may be implemented by module 100 with only a single image sensor 120.

This typically applies also to embodiments, in which the IR light from the second region of interest 2 and/or the third region of interest are guided via IR-waveguide 130 to dedicated respective IR detection areas of image sensor 120 (that may be sensitive for IR-light only) different to a visible light detection area that may be sensitive for visible light only.

As shown in FIG. 1A, IR-waveguide 130 may, not only in an upper part or portion facing the image sensor 120 but even as a whole, be at least substantially flat when seen in a sideview and/or in a projection onto a plane parallel to optical axis 165 and/or optical path 0 and/or arranged at least substantially parallel with respect to at least one of electronics carrier 110 and image sensor 120, in particular at least substantially parallel to the image plane of image sensor 120.

The term of an "at least substantially flat" 3D-object as used herein intends to describe that an extension of a minimum bounding box of the 3D-object in a first direction (in x-direction/direction of the optical axis 165) is at least about 5 times, typically at least about 10 times smaller than at least one of the other two extensions of the minimum bounding box in directions orthogonal to the first direction (in y-, and z-directions).

When seen in the sideview and/or the projection onto the plane parallel to optical axis 165 and/or optical path 0, IR-waveguide 130 may even be at least substantially shaped as a flat rectangle, e.g. as a rounded and/or at most slightly bended rectangle, and/or have a (maximum) thickness of at most a few millimeters, for example at most 3 mm or even 2 mm.

When seen in a front view and/or in a projection onto the image plane and/or a plane perpendicular to optical axis 165 and/or optical path 0, the upper part or portion of IR-waveguide 130 may have a minimum extension of at least about 1 cm, more typically at least about 2 cm, and/or may be shaped and/or sized in accordance with the (light sensitive part of) image sensor 120, but may also be larger than image sensor 120 and/or completely cover image sensor 120. Further, IR-waveguide 130 typically has, in this view/projection, two typically comparatively thin and/or elongated leg portions each providing a respective input aperture 131 and/or extending downwards from the upper part or portion of IR-waveguide 130 forming a central portion in this embodiment.

Typically, the IR-waveguide 130 projects via output aperture 135 IR-light from both eyes (second and third regions of interest) onto the same image sensor 120 and adjacent IR detection areas of image sensor 120, respectively.

Accordingly, eye image concatenation may be achieved on the sensor side, which reduces hardware requirements, data transmission complexity and may even be advantageous for subsequent (neural network based) image processing, in particular for gaze estimation.

Such a subsequent image processing may, at least in part, even be performed by a controller (not shown) on electronics carrier 110 functionally connected with image sensor 120.

More general, the (recorded) eye images/image data referring to the eye(s) of the user may e.g. be used for determining one or more gaze-related parameters of the user wearing a head-wearable device provided with the eye tracking module.

The gaze-related parameter may be a gaze-direction related parameter or a position and/or an eyelid closure, a pupil area, a pupil size, a pupil diameter, a measure of cognitive load, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a horizontal axis and/or a vertical axis, a limbus major and/or minor axes orientation, an eye cyclo-torsion, an eye intra-ocular distance, an eye vergence, a statistics over eye adduction and/or eye abduction, and a statistics over eye elevation and/or eye depression, data about blink events, drowsiness and/or awareness of the user, parameters for user iris verification and/or identification.

The gaze-direction related parameter may be a gaze direction, a cyclopean gaze direction, a 3D gaze point, a 2D gaze point, a visual axis orientation, an optical axis orientation, a pupil axis orientation, and a line of sight orientation of the user.

Further, the images/image data referring to the field of view of the user wearing the head-wearable device may be provided and optionally further processed with the eye tracking module. In the following, the images of the field of view of the user are also referred to as scene images.

Corresponding scene and eye images may e.g. be used to determine what the user is looking at.

Points and directions may be specified within the scene camera images, an eye camera coordinate system, a scene camera coordinate system, an eye tracking module coordinate system, a head coordinate system, a world coordinate system and/or any other suitable coordinate system.

When the eye tracking module is attached to a frame or support structure of a head-wearable device, the field of view of wearer may not be occluded, at least not discernible for the wearer. Note that an obstruction of the visible field of the user may essentially not be noticeable by the user since the human mind mostly ignores any obstruction in the nose area of the face, because the nose itself forms a permanent obstruction of the optical field.

Traditional eye tracking devices use non-transparent structures which carry image sensors and optics and electronic components like PCBs, in order to capture images of the eyes. The use of an IR-waveguide which is transparent to visible light and only captures IR-light has been found to advantageously at the same time minimize occlusion of the field of view of the user while enabling optimal view onto the eyes of the user, minimizes the weight and thus improves wearing comfort of the eye tracker/module, and enables a very compact overall design of an eye tracking module, since it reduces the number of necessary components.

Figure 1C:
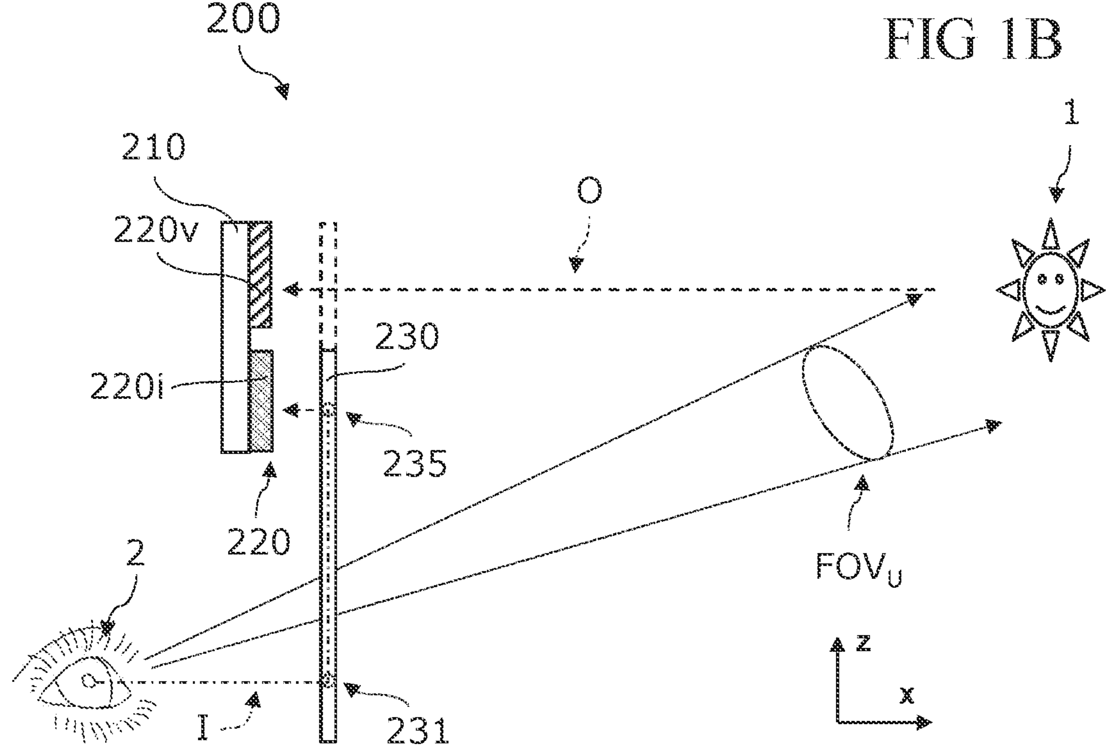
FIG. 1C a schematic side view of an eye tracking module for a head-wearable device of a user according to an embodiment.

With respect to FIG. 1C another eye tracking module 200 for complementing head-wearable user devices is explained. Eye tracking module 200 is typically similar to eye tracking module 100 explained above with regard to FIGS. 1A, 1B.

However, image sensor 220 arranged on electronics carriers 210 is implemented as a two-part RGB/IR sensor with a first contiguous sensor portion (lower part of sensor 220 in FIG. 1C) only providing IR sensitive sensor areas 220*i*, and a second contiguous sensor portion (upper part of sensor 220 in FIG. 1C) only providing visible light sensitive sensor areas 220*v*.

As indicated by the dashed rectangle in FIG. 1C, IR-waveguide 230 may not be arranged in the optical path 0 for receiving visible light from the first region of interest 1.

Nevertheless, IR-waveguide 230 is typically transparent for visible light in this embodiment too. This has the advantage that visible light from the scene/environment is not polluting the images to be formed of the second and third (eye) regions of interest.

Figure 2A:
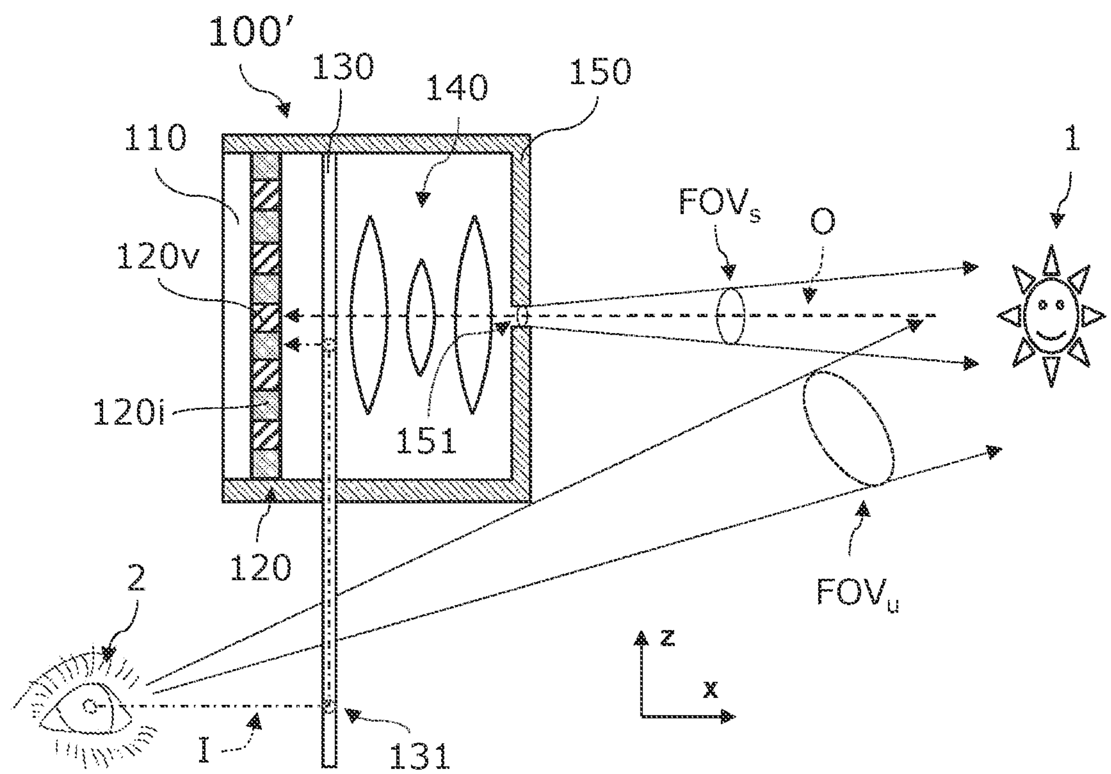
FIG. 2A illustrates a schematic side view of an eye tracking module for a head-wearable device of a user according to an embodiment.

With reference to FIG. 2A, an embodiment of an eye tracking module 100' for a head-wearable user devices is explained. Eye tracking module 100' is also typically similar to eye tracking module 100 explained above with regard to FIGS. 1A, 1B, but additionally has a housing 150 housing the electronics carrier 110 with the image sensor 120 as well as an upper central portion of the IR-waveguide 130 including output aperture 135 in front of image sensor 120.

Further, housing 150 has an opening arranged in the optical path 0 providing and/or holding an aperture 151 for the visible light from the first region of interest 1.

Aperture 151 may delimit a scene camera field of view FOVs which substantially corresponds with at least a central part of and/or is defined related to the true field of view $FOV_U$ of the user wearing the complemented head-wearable device.

In addition, an exemplary lens system 140 is provided within housing 150, and arranged between the receiving aperture 151 and the image sensor 120 for projecting the visible light onto image sensor 120. In the exemplary embodiment, lens system 140 is arranged between the receiving aperture 151 and the IR-waveguide 130.

Figure 2B:
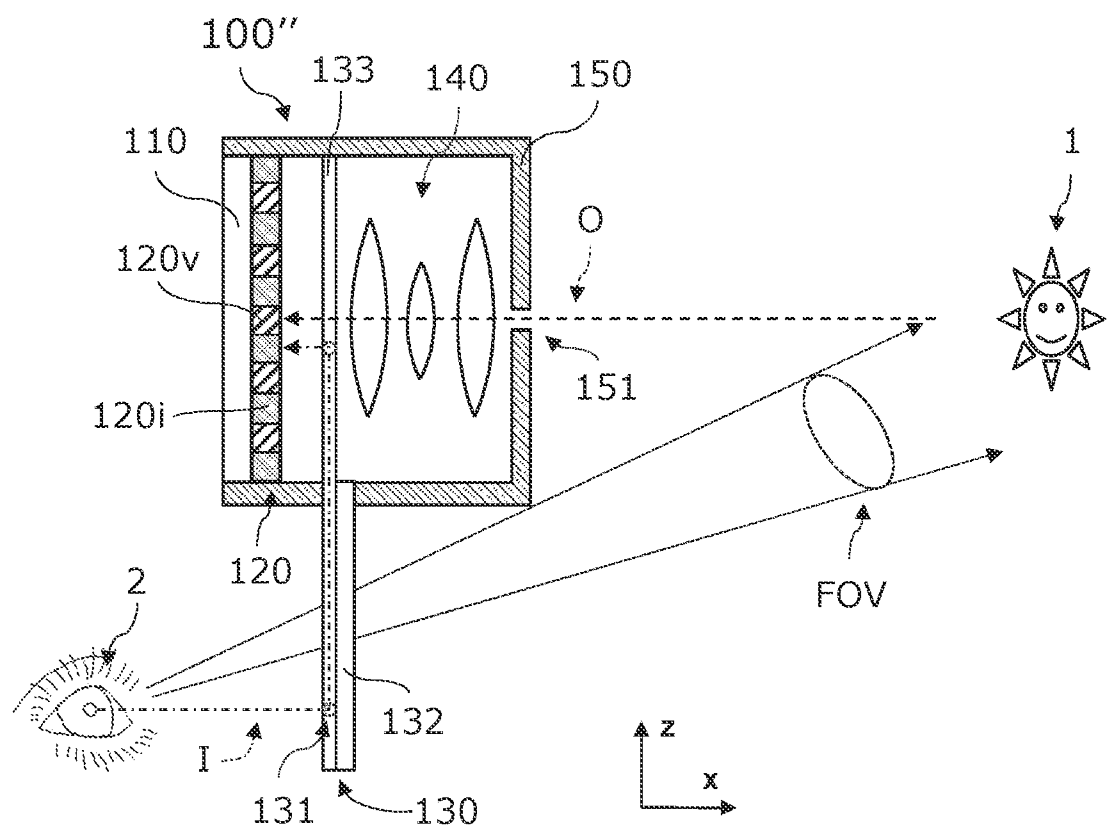
FIG. 2B illustrates a schematic side view of an eye tracking module for a head-wearable device of a user according to an embodiment.

With respect to FIG. 2B another eye tracking module 100" for complementing head-wearable user devices is explained. Eye tracking module 100" is typically similar to eye tracking module 100' explained above with regard to FIG. 2A.

However, the IR-waveguide 131, 132 of eye tracking module 100" has a carrier or substrate 132 and a thin polymeric film 133 arranged on carrier or substrate 132.

Due to carrier or substrate 132, stability of the IR-waveguide 131, 132 outside module housing 150 may be increased.

Carrier or substrate 132 is typically also transparent for visible light.

Figure 3A:
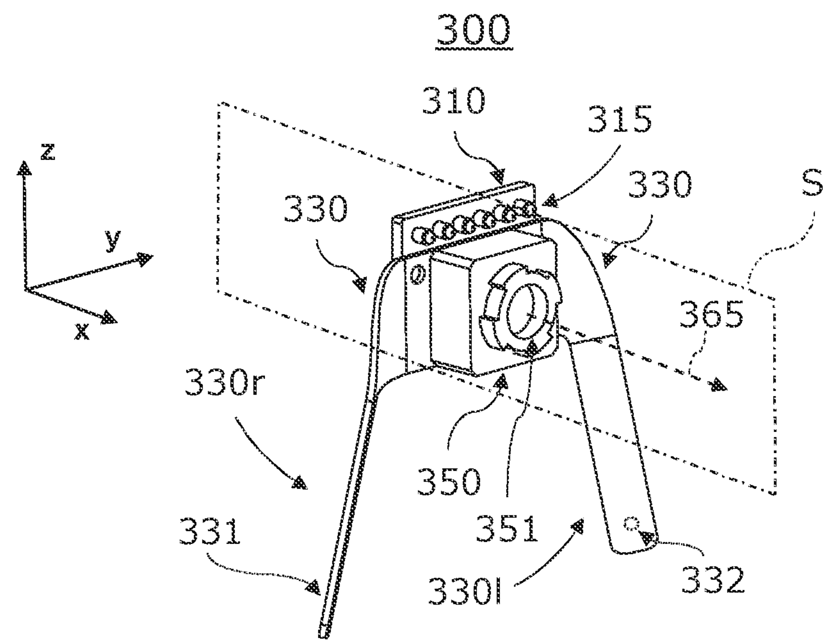
FIG. 3A illustrates a perspective view of an eye tracking module for a head-wearable device of a user according to an embodiment.
Figure 3B:
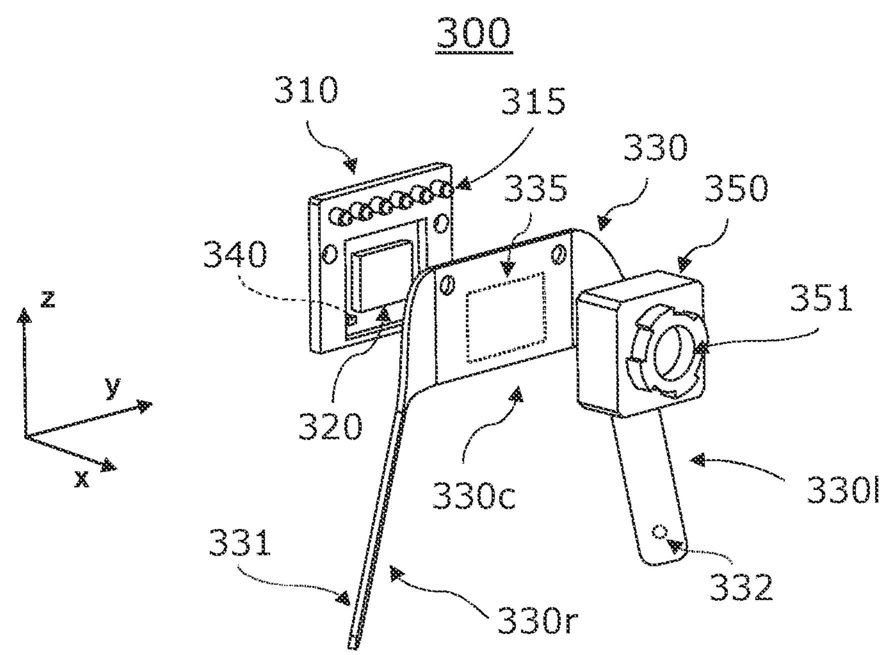
FIG. 3B illustrates an exploded view of the eye tracking module illustrated in FIG. 3A.

With respect to FIGS. 3A, 3B an embodiment of an eye tracking module 300 for head-wearable user devices is explained.

Eye tracking module 300 is typically similar to eye tracking module 100' explained above with regard to FIG. 2A.

However, housing 350 of module 300 is implemented as a cover only covering a (lower main) part of electronics carrier 310 with image sensor 320 and a central portion 330*c* of the substantially U-shaped and thin IR-waveguide 330 having two leg portions 3301, 330*r*, namely a first or right leg portion 330*r* and a second or left leg portion 3301 each providing a respective (first/left and second/right, respectively) input aperture 331, 332 on the backside in the perspective views.

Housing 350 may be screwed with an outer frame of electronics carrier 310 (through not shown holes in the IR-waveguide 330 and the frame of electronics carrier 310) or glued to IR-waveguide 330 which is glued to the frame of electronics carrier 310.

The eye tracking module may fit into an enveloping cuboid (minimum bounding box) with dimensions of at most about 2.5 cm×5 cm×5 cm, more typically at most about 1 cm×4 cm×4.5 cm or even at most about 0.5 cm×4 cm×4.5 cm.

In the exemplary embodiment, the frame of electronics carrier 310 surrounds a recess of electronics carrier 310 for accommodating electronics carrier 310, and optionally other electronics components such as a controller (not shown).

The illustrated through hole in the IR-waveguide 330 and the frame of electronics carrier 310 may be used for fastening (screwing) with a support structure of a head-wearable device to be complemented with module 300.

As explained above, the input aperture 331, 332 may also be used for illuminating the user's eyes with IR-light guided by wave guide 330 from IR-light source 340 typically implemented as an IR-LED to apertures 331, 332.

In the exemplary embodiment, IR-light source 340 is also arranged in the recess and on electronics carrier 310, respectively.

The leg portions 3301, 330*r* are shaped such that the IR-light leaving apertures 331, 332 can illuminate the user's eyes, and that backscattered (back-reflected) IR-light is coupled into apertures 331, 332. From there, the in-coupled backscattered IR-light is guided to a common output aperture 335 in front of an RGB-IR image sensor 320 for detecting both the backscattered IR-light and visible light received along an optical path from a typically remote (in terms of the dimensions of module 300) first region of interest which is related with a field of view of a user, and the optical axis 365 of image sensor 320 is pointing to (when the user is wearing the head-wearable device).

Input apertures 331, 332 may include etchings or gratings which implement optical elements to focus and/or direct and guide IR light and thereby provide miniature input optics similar to optics 140.

The optical axes of such optics may be perpendicular to the substantially flat surrounding part of the waveguide 330, or may be oriented at a different angle thereto in order to optimally collect IR light from the second and/or third regions of interest.

The central optical path for receiving visible light from a first region of interest typically also lies in a plane S in which the optical axis 365 lies, and also runs through a receiving aperture/lens 351 for the visible light. Plane S may form a symmetry plane of module 300.

Further, outside housing 350, electronics carrier is equipped with an electric interface 315 fitting with a counterpart of the support structure of the head-wearable device to be complemented with module 300, in particular a respective data and power interface 315 for power supply of the other components of electronics carrier 310, in particular the image sensor 320 and the IR-light source 340.

Electric interface 315 may also be used for transferring raw image data obtained with image sensor 320 and/or processed image data.

Furthermore, the other components of electronics carrier 310 may receive control signals or commands via electric interface, in particular if the controller/any desired controlling and/or computational functionality such as image processing functionality and/or gaze parameter detection is at least in part provided by a controller of the head-wearable device to be complemented or even a companion device such as smartphone, a tablet or the like functionally connected with (an internal bus of) the head-wearable device.

In the exemplary embodiment, interface 315 is implemented as a single row of six exemplary pins/electric contacts. The number of pins may, depending on the bus type, be different, typically in arrange of four (USB type A, B) to 24 pins (USB type C 3.0).

Figure 4A:
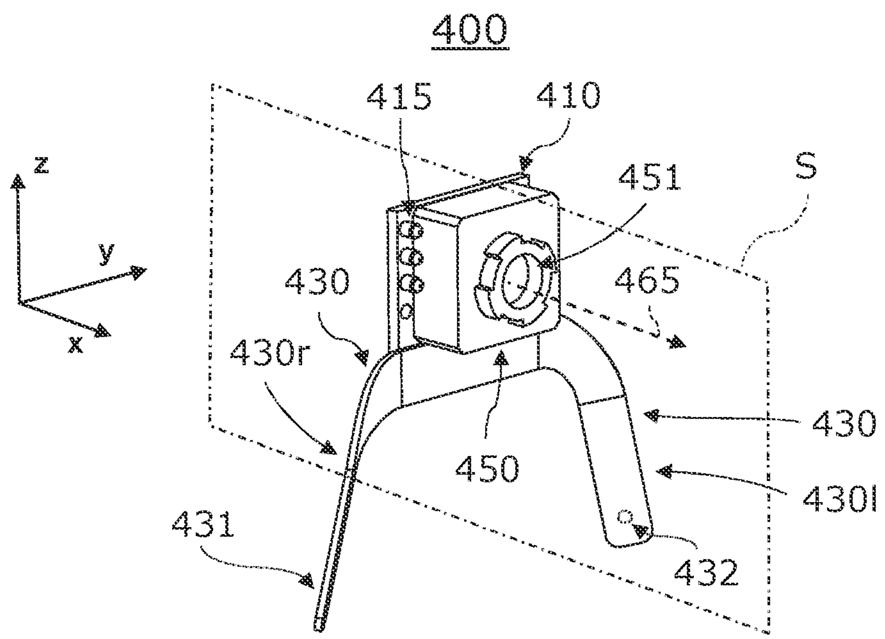
FIG. 4A illustrates a perspective view of an eye tracking module for a head-wearable device of a user according to an embodiment.
Figure 4B:
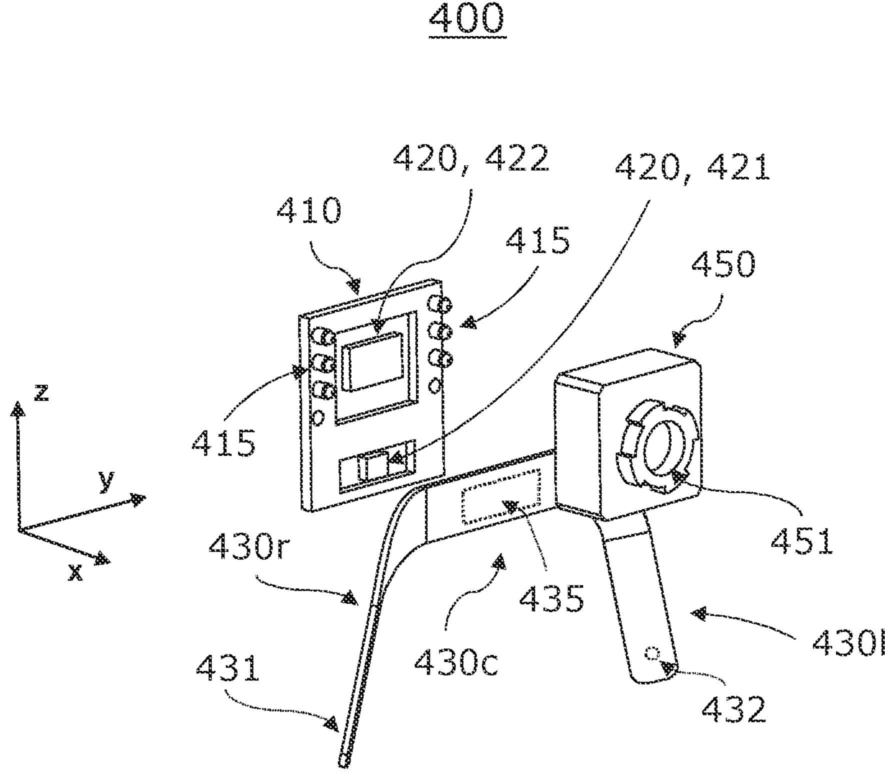
FIG. 4B illustrates an exploded view of the eye tracking module illustrated in FIG. 4A.

With respect to FIGS. 4A, 4B an embodiment of an eye tracking module 400 for head-wearable user devices is explained.

Eye tracking module 400 shares similarities with eye tracking module 200 explained above with regard to FIG. 1C and eye tracking module 300 explained above with regard to FIGS. 3A, 3B.

In the exemplary embodiment, eye tracking module 400 has a two-part image sensor 420 arranged on common electronics carrier 410, namely an IR-array-sensor 421 for detecting (backscattered) IR-light received at the first and second input apertures 431, 432 of IR-waveguide 430 and output to IR-sensor 421 from common output aperture 435, and an RGB-sensor 422 for receiving visible light related to a field of view of a user looking at a scene the optical axis 465 of RGB-image sensor 422 is also pointing to (when the user is wearing a head-wearable device complemented with module 400).

Each of the image sensor parts 422, 421 of image sensor 420 are arranged in a respective recess of electronics carrier 410.

The lower recess of electronics carrier 410 typically also accommodates an IR-light source such as an IR-LED (not shown).

As illustrated in FIGS. 4A, 4B, the electric interface 415 may also be implemented in two parts, for example two rows of pins arranged at a respective lateral side of frame of electronics carrier 410.

Furthermore, IR-waveguide 430 typically does not cover RGB-sensor 422 in assembled state of module 400. Accordingly, an extension of the central portion 430*c* of IR-waveguide 430 of module 400 may, compared to the IR-waveguide 330 of module 300, be lower in vertical direction z.

Different thereto, the shape and size of leg portions 430*r*, 4301 may be similar as for module 300.

The first and second leg portions 330*r*, 3301, 430*r*, 4301 may themselves be substantially flat. The planes defined by such flat leg portions may, however, form an angle different from 0° or 180° with the substantially flat central portion of the IR-waveguide, as shown in FIGS. 3AB, 4AB and 5AB. This may aid in optimally orienting the input aperture forming leg portions for aiming them at the second respectively third regions of interest.

In an alternative example, the planes defined by flat leg portions may also be co-planar with the substantially flat central portion of the IR-waveguide, such that the entire IR-waveguide may form a substantially flat structure, as shown in FIGS. 1AC and 2AB. This results in a particular simple manufacturing process.

Figure 5A:
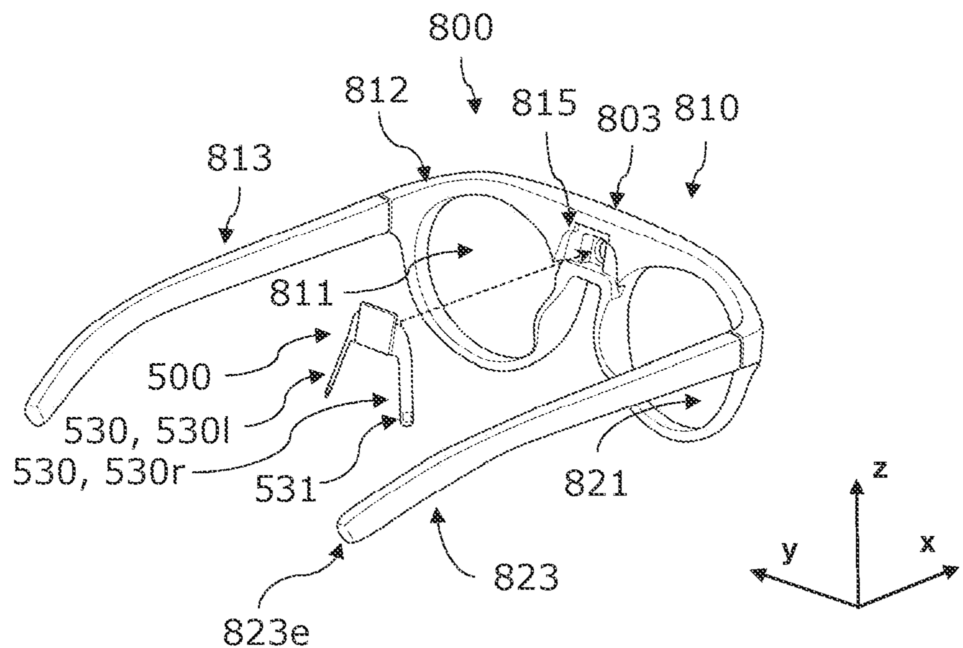
FIG. 5A illustrates a perspective view of an eye tracking module and a head-wearable device to be complemented with the eye tracking module.
Figure 5B:
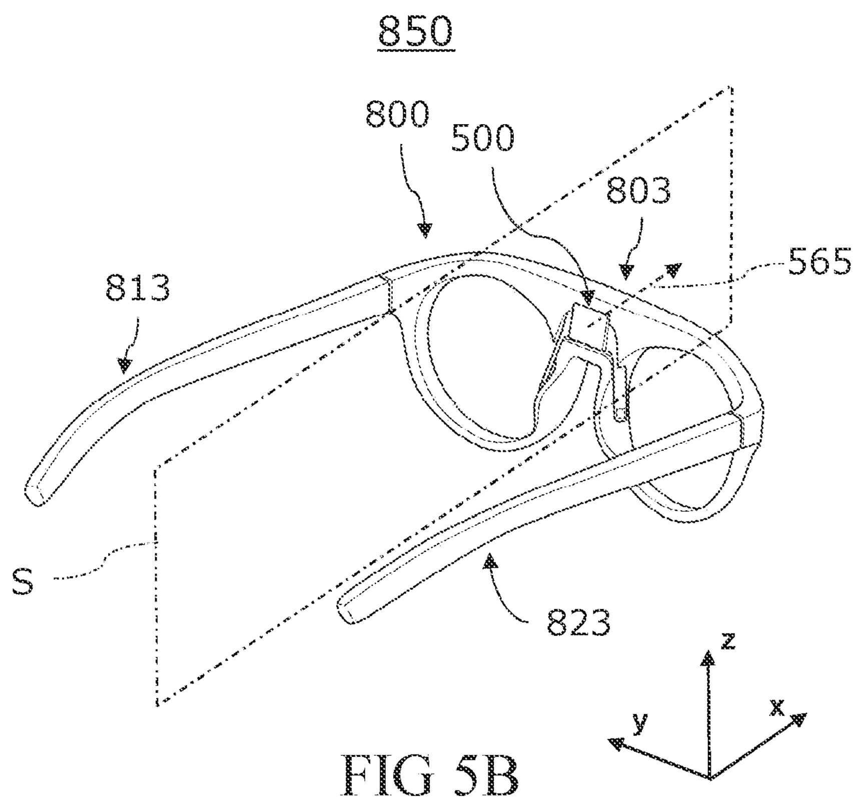
FIG. 5B illustrates the head-wearable device with the attached eye tracking module shown in FIG. 5A according to an embodiment.

FIG. 5A illustrates a perspective view of a head-wearable device 800 to be complemented with an eye tracking module 500. Eye tracking module 500 also has an electronics carrier equipped with an image sensor defining an optical axis 565, and an IR-waveguide 530 with a central portion and two leg portions 5301, 530*r* each providing a respective input aperture 531 only one of which is visible in FIGS. 5A, 5B. Eye tracking module 500 may be at least similar to any of the eye tracking modules 100, 100', 100", 200, 300, 400 explained above with regard to FIGS. 1A to 4B.

In the exemplary embodiment, head-wearable device 800 is implemented as spectacles device. Accordingly, a frame 810 of spectacles device 800 has a front portion 812 surrounding a left ocular opening 811 and a right ocular opening 821 for respective spectacle lenses. A central (bridge) portion 803 of front portion 812 is arranged between the ocular openings 811, 821. Further, a left temple 813 and a right temple 823 are attached to front portion 812.

Frame 810 and front portion 812, respectively, form a support structure of head-wearable device 800.

Central portion 803 includes a recess or opening 815 for receiving module 500.

In the exemplary embodiment, the recess or opening 815 is formed such that upper portion of module 500 fits into it while the lower ends of the left and right leg portions 5301, 530*r* extends to positions right and left of the respective nose pad parts of central portion 803 so that IR-light backscattered from the eyes of the user (wearing the assembled device 850) can be coupled in via the input apertures 531, 532 (that may also be used for outcoupling IR-light illuminating the user's eyes).

To assist guidance during attaching eye tracking module 500 (see dashed arrow) and/or improve the grip in mounted/attached state, sidewalls of upper portion of module 500 and frame 810 in the bridge portion 803 may include respective interfitting structures such as a groove and a projection extending in x-direction/direction of optical axis 565.

Leg portions 5301, 530*r* of IR-waveguide 530 may however be without direct contact to portions of frame 810. This prevents mechanical flex, stress, tension or bending of the frame 810 to be transferred to the leg portions, which in turn has advantages for gaze estimation accuracy, the latter usually suffering from unpredicted mechanical deformations of the image-forming optical components of an eye tracking device.

Further, a first electric connector fitting with the electric interface of module 500 (both not shown in FIG. 5A and hidden in FIG. 5B), for example one or two plugs for the pins of the electric interface, may be accommodated in central portion 803 and arranged on the wearer-side of central portion 803.

Furthermore, a passage opening for a scene camera field of view around optical axis 565 is formed in central portion 803.

Typically, a second electric connector in electric contact with the first electric connector (via a not shown internal wiring/internal bus) may be accommodated at a respective dorsal end 813*e*, 823*e* of the left or right temple 813, 823.

The second electric connector may be used for connecting with a companion device such as a smartphone or tablet. For example, the second electric connector may be a USB-connector, for example a USB-C connector.

According to an embodiment of an eye tracking module for a head-wearable device of a user, the eye tracking module includes an electronics carrier, an image sensor arranged on the electronics carrier, an optical path for receiving visible light at the image sensor from a first region of interest, and an IR-waveguide arranged with respect to the optical path such that received visible light is at least substantially not diverted and/or guided by the IR-waveguide and/or that the IR-waveguide is operable as a plane-parallel plate for the visible light. The IR-waveguide includes a first input aperture for receiving IR-light from a second region of interest which is different to the first region of interest, and an output aperture for outputting at least a part of the received IR-light towards the image sensor, preferably for (directly) outputting at least a part of the received IR-light to the image sensor.

The IR-waveguide typically further includes a second input aperture for receiving IR-light from a third region of interest.

Further, the IR-waveguide is typically configured to guide IR-light from the second input aperture to the output aperture.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. An eye tracking module for complementing a head-wearable device of a user, the eye tracking module comprising:

an electronics carrier;

an image sensor arranged on the electronics carrier;

a straight optical path for receiving visible light at the image sensor from a first region of interest; and an IR-waveguide arranged with respect to the optical path to avoid received visible light from being diverted and/or guided by the IR-waveguide, the IR-waveguide comprising a first input aperture for receiving IR-light from a second region of interest which is different to the first region of interest, and an output aperture for outputting at least a part of the received IR-light towards the image sensor, wherein the IR-waveguide is a one-piece structure, wherein the IR-waveguide comprises, in a direction at least substantially parallel to the optical path and/or an optical axis of the image sensor, and/or at least substantially perpendicular to an image plane of the image sensor, a thickness of at most about 2 mm, wherein the IR-waveguide is, in a projection onto a projection plane at least substantially perpendicular to the optical path and/or the optical axis, and/or onto to the image plane of the image sensor, U-shaped, and/or wherein the IR-waveguide or even the eye tracking module is mirror symmetric with respect to a symmetry plane parallel to the optical path and/or the optical axis.

2. The eye tracking module of claim 1, wherein the IR-waveguide is arranged in the optical path, wherein visible light received via the optical path traverses the IR-waveguide, wherein the IR-waveguide is configured for not guiding visible light and/or wherein the IR-waveguide is at least substantially transparent for the visible light, at least in a portion that is arranged in the optical path.

3. The eye tracking module of claim 1, wherein no prism is arranged between the output aperture and the image sensor.

4. The eye tracking module of claim 1, wherein no optical element is arranged between the output aperture and the image sensor.

5. The eye tracking module of claim 1, wherein the IR-waveguide comprises a carrier or substrate and a thin polymeric film arranged on the carrier or substrate.

6. The eye tracking module of claim 1, wherein the IR-waveguide comprises a second input aperture for receiving IR-light from a third region of interest.

7. The eye tracking module of claim 6, wherein the IR-waveguide is configured to guide IR-light from the first input aperture to the output aperture, and from the second input aperture to the output aperture.

8. The eye tracking module of claim 1, further comprising an IR-light source arranged on the electronics carrier, wherein the output aperture is configured to receive illumination light from the IR-light source.

9. The eye tracking module of claim 1, wherein the first input aperture is arranged in a first leg portion of the IR-waveguide, wherein the second input aperture is arranged in a second leg portion of the IR-waveguide, wherein the first region of interest corresponds to a scene in front of the user wearing the head-wearable device, wherein the first region of interest is related to a field of view of the user wearing the head-wearable device, wherein the second region of interest is related to a first eye of the user wearing the head-wearable device, and/or wherein the third region of interest is related to a second eye of the user wearing the head-wearable device.

10. The eye tracking module of claim 1, wherein the image sensor comprises at least one of: an array sensor, and a filter arranged on the array sensor, in particular a Bayer filter, and/or wherein the image sensor comprises a plurality of visible light sensitive sensor areas and a plurality of IR-sensitive sensor areas, the plurality of visible light sensitive sensor areas and the plurality of IR-sensitive sensor areas being arranged in and/or at the image plane.

11. The eye tracking module of claim 10, wherein the image plane defines an optical axis of the image sensor, wherein the image plane is perpendicular to the optical axis and/or parallel to a flat central portion of the IR-waveguide, the central portion including the output aperture, the central portion being arranged close to the image sensor.

12. The eye tracking module of claim 1, wherein the image sensor comprises interleaved visible light sensitive sensor areas and IR-sensitive sensor areas, and/or is implemented as an RGB-IR sensor comprising at least one RGB-IR kernel.

13. The eye tracking module of claim 1, further comprising at least one optical element arranged in the optical path, in particular a receiving aperture for the visible light and/or a lens or even a lens system arranged between the receiving aperture and the image sensor for projecting the visible light onto the image sensor, in particular onto the image plane.

14. The eye tracking module of claim 1, wherein the electronics carrier comprises at least one of an electric interface, in particular a respective data and power interface, and a controller functionally connected with at least one of: the electric interface, the image sensor, and the IR-light source, the controller being configured, using data received from the image sensor, to generate time-correlated images of at least two of the first region of interest, the second region of interest and the third region of interest, in particular to generate time-correlated images pairs comprising a scene image representing the first region of interest and a concatenated eye image representing the second region of interest and the third region, to postprocess the time-correlated images and/or the data received from the image sensor, in particular using a trained neural network, and/or to transmit the time-correlated images and/or the data received from the image sensor via the data interface.

15. The eye tracking module of claim 1, further comprising a housing connected with the electronics carrier and covering at least one of the central portion of the IR-waveguide, the IR-light source, and the image sensor, the housing fitting with a central portion of a support structure of the head-wearable device, the central portion providing and/or being shaped as a nose bridge portion of the head-wearable device.

16. The eye tracking module of claim 1, wherein the IR-waveguide is arranged in the optical path and operable as a plane-parallel plate for the visible light.

17. The eye tracking module of claim 1, wherein the IR-waveguide comprises:

a flat central portion comprising the output aperture; and a first leg portion comprising the first input aperture and forming an angle different from 0° or 180° with the flat central portion.

18. An eye tracking module for complementing a head-wearable device of a user, the eye tracking module comprising:

an electronics carrier;

an image sensor arranged on the electronics carrier;

an optical path for receiving visible light at the image sensor from a first region of interest; and an IR-waveguide arranged with respect to the optical path to avoid received visible light being diverted and/or guided by the IR-waveguide, the IR-waveguide comprising a first input aperture for receiving IR-light from a second region of interest which is different to the first region of interest, and an output aperture for directly outputting at least a part of the received IR-light to the image sensor, wherein the IR-waveguide comprises:

a flat central portion comprising the output aperture; and a first leg portion comprising the first input aperture and forming an angle different from 0° or 180° with the flat central portion.

19. The eye tracking module of claim 18, comprising a housing connected with the electronics carrier and covering at least one of the flat central portion of the IR-waveguide, the IR-light source, and the image sensor, the housing including a receiving aperture for the visible light.

20. A head-wearable device, comprising:

a support structure comprising a central portion providing and/or being shaped as a nose bridge portion; and an eye tracking module connected with the central portion, the eye tracking module comprising:

an electronics carrier;

an image sensor arranged on the electronics carrier;

an optical path for receiving visible light at the image sensor from a first region of interest, wherein the first region of interest is related to a field of view of a user when wearing the head-wearable device; and an IR-waveguide arranged with respect to the optical path such that received visible light avoids being diverted and/or guided by the IR-waveguide, the IR-waveguide comprising a first input aperture for receiving IR-light from a second region of interest which is different to the first region of interest, and an output aperture for outputting at least a part of the received IR-light towards the image sensor, wherein the IR-waveguide comprises:

a flat central portion comprising the output aperture; and a first leg portion comprising the first inpat aperture and forming an angle different from 0° or 180° with the flat central portion.

* * * * *